United States Patent
Balamucki et al.

(10) Patent No.: US 6,367,343 B1
(45) Date of Patent: Apr. 9, 2002

(54) NON-METALLIC PISTON IN A HEAVY VEHICLE TRANSMISSION AND METHOD OF ASSEMBLING THE PISTON

(75) Inventors: Tom Balamucki; Landon Ball; Peggy Marie Garrett, all of Laurinburg, NC (US)

(73) Assignee: ZF Meritor, LLC, Laurinburg, NC (US)

( * ) Notice: Subject to any disclaimer, the term of this patent is extended or adjusted under 35 U.S.C. 154(b) by 0 days.

(21) Appl. No.: 09/571,901

(22) Filed: May 16, 2000

(51) Int. Cl.$^7$ .................... F16H 59/00; F16H 61/00; F16H 63/00
(52) U.S. Cl. .................................. 74/335; 74/336 R
(58) Field of Search .................. 74/335, 336 R, 74/337

(56) References Cited

U.S. PATENT DOCUMENTS

| 4,981,202 A | * | 1/1991 | Leigh-Monstevens et al. ... 192/92 |
| 6,092,433 A | * | 7/2000 | Rose et al. .................... 74/335 |

FOREIGN PATENT DOCUMENTS

| DE | 2716493 | * | 10/1978 |
| DE | 00/00753 | * | 1/2000 |

* cited by examiner

Primary Examiner—Sherry Estremsky
Assistant Examiner—Tisha D. Lewis
(74) Attorney, Agent, or Firm—Carlson, Gaskey & Olds

(57) ABSTRACT

A heavy vehicle transmission includes a multi-speed main gear box and an auxiliary gear box, such as a range or splitter gear box, coupled to the main gear box. The transmission assembly includes a shaft having an outwardly extending abutment element and a step portion. A piston constructed of non-metallic materials is mounted on the shaft. After the piston is mounted on the shaft, a retaining device is secured on the shaft for firmly retaining the piston on the shaft against the abutment element so the piston does not lean or tilt relative to the shaft to become misaligned or improperly seated, and the transmission assembly functions optimally. To accomplish this, the retaining device includes a spacing element and a locking member. The locking member is fastened on the shaft until the spacing element automatically abuts the step portion thereby retaining the piston of the assembly against the abutment element of the shaft. The step portion has a predetermined geometry on the shaft to facilitate quick and efficient assembly of the piston and the retaining device. A method for assembling the piston is also disclosed.

22 Claims, 2 Drawing Sheets

NON-METALLIC PISTON IN A HEAVY VEHICLE TRANSMISSION AND METHOD OF ASSEMBLING THE PISTON

BACKGROUND OF THE INVENTION

The subject invention relates to a heavy vehicle transmission auxiliary gear box including a power cylinder where a piston is constructed of non-metallic materials and is prevented from becoming misaligned during operation. The invention also relates to a method of assembling the piston where the non-metallic piston is not damaged during assembly.

Heavy vehicles generally utilize transmissions to achieve selected speeds between an engine and an output shaft. A typical transmission includes a main gear box and an auxiliary gear box. The main gear box may include five gear ranges that may be selected by a vehicle operator. The auxiliary gear box may include a splitter gear box, a range gear box, or both.

The auxiliary gear box of the typical multi-speed transmission may be actuated automatically based upon system conditions or may be actuated by an operator switch. An auxiliary gear box gear change is typically driven by a power cylinder. The power cylinder includes a piston driven by a fluid, such as air. The fluid actuates the piston and drives a collar to select a particular output from the auxiliary gear box. The collar engages gears.

Conventionally, the piston is manufactured from metallic materials such as steel. It would be desirable to have freedom in the selection of materials, other than metallic materials, used to manufacture the piston. However, such alternative materials often require additional structural support to prevent the piston from becoming misaligned or improperly seated. That is, the piston may lean or tilt within the piston cylinder. When the piston is improperly seated, the piston is unable to effectively drive the collar to engage the gears and select the particular output from the auxiliary gear box.

It would be desirable to efficiently mount and retain the piston to prevent the piston from leaning or tilting within the piston cylinder so that the piston may be constructed of alternative, non-metallic materials and will still properly drive the collar to engage the auxiliary gear box.

SUMMARY OF THE INVENTION AND ADVANTAGES

In a disclosed embodiment, a piston is constructed of a non-metallic material. The piston is also properly supported so the piston does not become misaligned during operation or damaged during assembly. A transmission assembly includes a power cylinder and an auxiliary gear box. The transmission assembly also includes a multi-speed transmission main gear box. A piston housing is associated with the auxiliary gear box. A piston shaft is further included in the transmission assembly. The shaft includes proximate and distal ends and an abutment element. The abutment element extends outwardly from the proximate end of the shaft. A piston is assembled in the transmission assembly by mounting the piston on the proximate end of the shaft.

After mounting the piston on the shaft, a retaining device is secured on the proximate end of the shaft for retaining the piston on the shaft against the abutment element. As a result, less rigid, non-metallic materials may be used to construct the piston. Such materials typically tend to lean and tilt within the piston housing. However, in the subject invention, pistons constructed of these materials are firmly retained on the shaft against the abutment element. Also, the proximate end of the shaft includes a step portion. The step portion of the shaft facilitates efficient assembly as the retaining device can be quickly assembled to the shaft by securing the retaining device to abut the step portion of the shaft. As such, the non-metallic piston is not damaged during assembly.

Accordingly, the subject invention provides a piston constructed of less rigid, non-metallic materials where the piston is properly supported by the retaining device and the abutment element such that misalignment of the piston is avoided. Further, the subject invention provides a method of efficiently assembling the non-metallic piston in the transmission assembly by incorporating a step portion that avoids damage to the piston during assembly.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
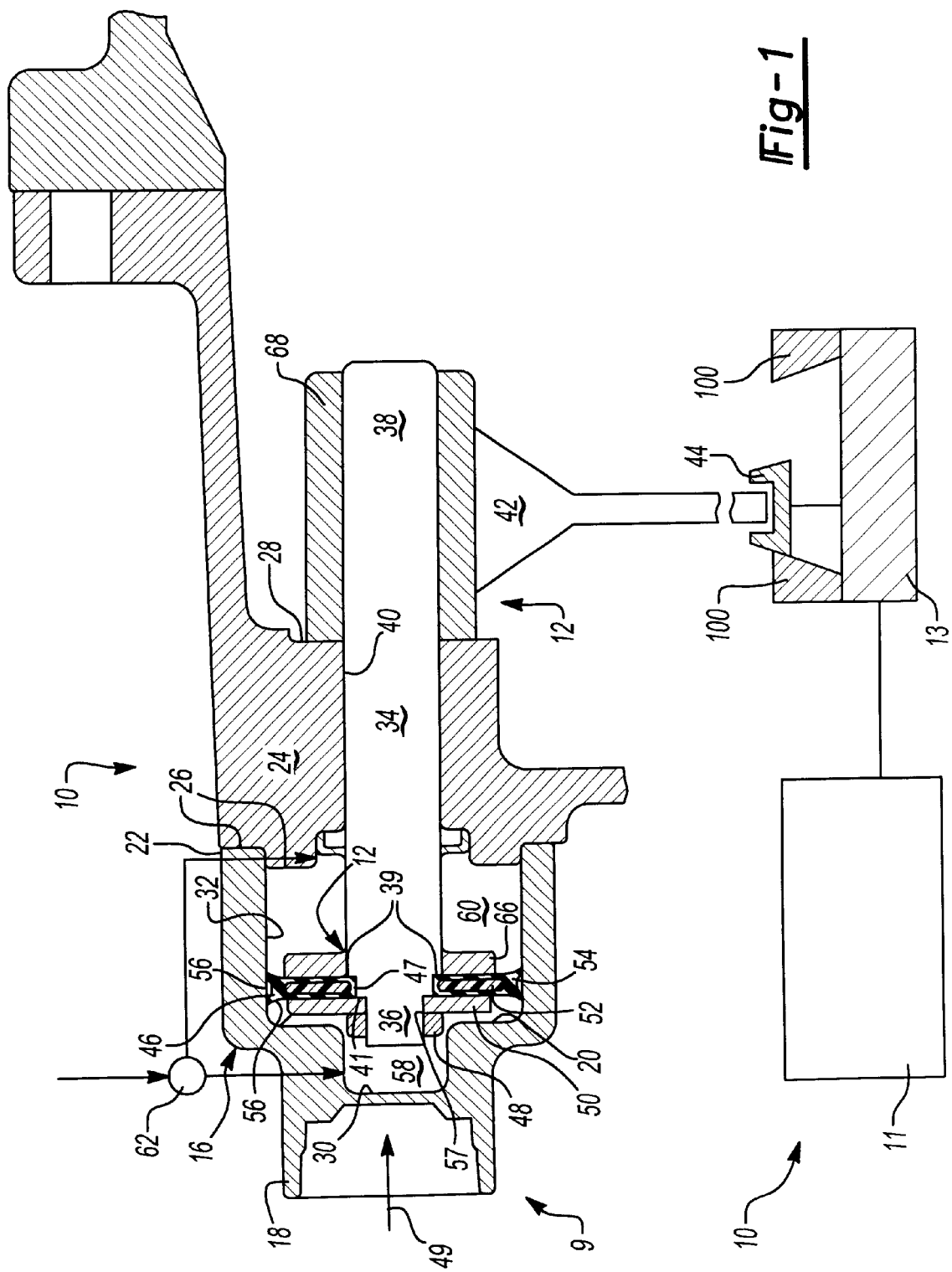
FIG. 1 is a partially cross-sectional schematic view of a transmission assembly including a multi-speed main gear box and an auxiliary gear box in a first position.
Figure 2:
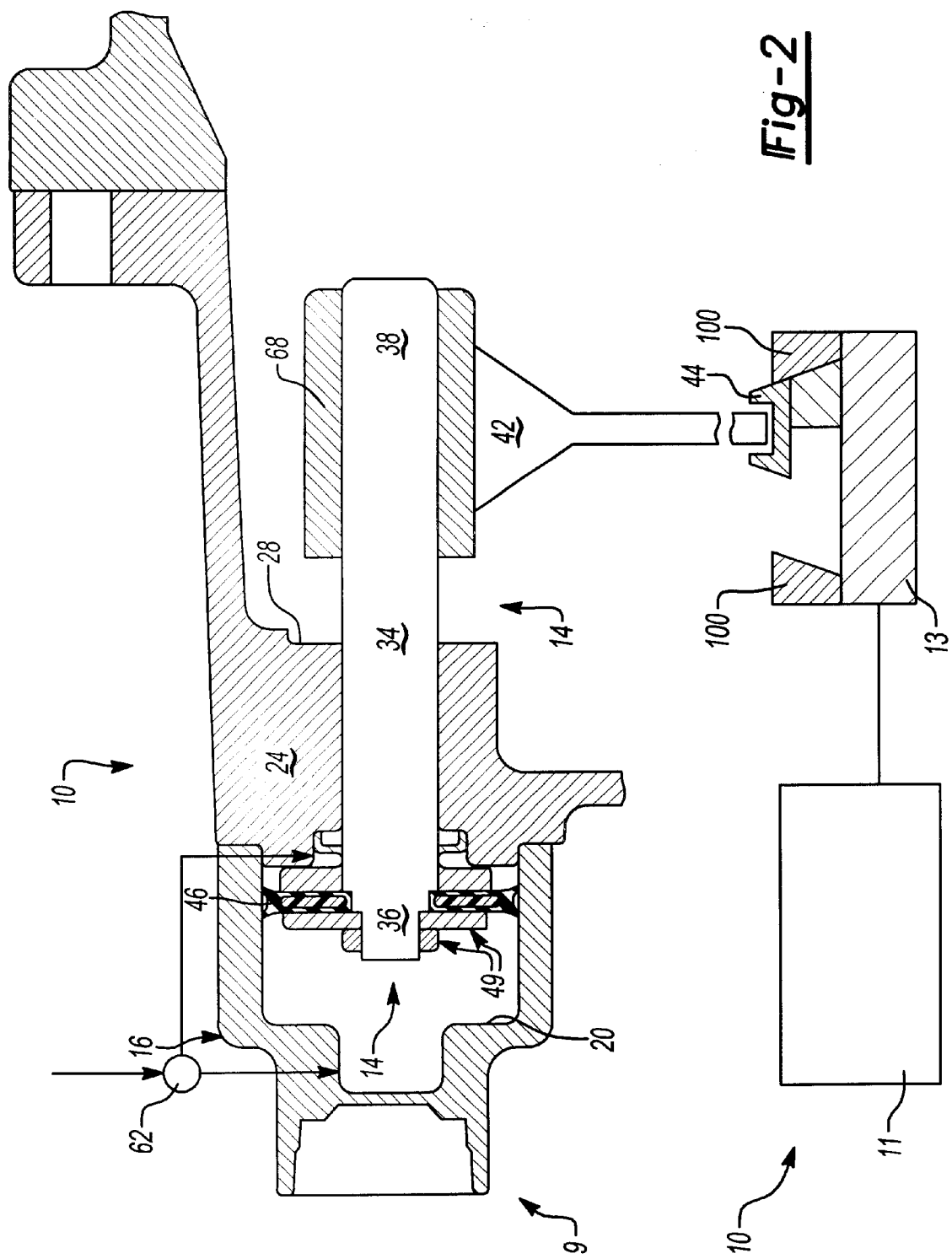
FIG. 2 is a partially cross-sectional schematic view of the transmission assembly including the multi-speed main gear box and the auxiliary gear box in a second position.

Referring to FIGS. 1 and 2, a power cylinder 9 and a transmission assembly 10 for a heavy vehicle are shown. The transmission assembly 10 includes a multi-speed transmission main gear box 11 and an auxiliary gear box 13. The auxiliary gear box 13 is coupled to the main gear box 11 as known in the art. It is to be understood that FIGS. 1 and 2 are highly schematic and the invention may be arranged in a manner other than shown. For instance, as shown in the Figures, the power cylinder 9 is external to the auxiliary gear box 13. However, it is to be understood that the power cylinder 9 may be disposed within the auxiliary gear box 13 without varying the scope of the subject invention. Also, the size of the main gear box 11 and the auxiliary gear box 13 are much smaller than they would be relative to the power cylinder 9. The auxiliary gear box 13 of the transmission assembly 10 reciprocates between a first position 12 (FIG. 1) and a second position 14 (FIG. 2) to effect a desired shift in the auxiliary gear box 13. The auxiliary gear box 13 as shown in the Figures may be a splitter gear box. Although not shown, the auxiliary gear box 13 could be a range gear box without varying the scope of the subject invention.

The transmission assembly 10 includes a piston housing 16. The piston housing 16 includes a piston cylinder 18 having first 20 and second 22 ends, and an auxiliary housing 24 having first 26 and second 28 abutment surfaces. The piston housing 16 generally defines an internal fluid chamber 30 having an inner surface 32. More specifically, the first abutment surface 26 of the auxiliary housing 24 abuts the second end 22 of the piston cylinder 18 to further define the internal fluid chamber 30.

The transmission assembly 10 further includes a shaft 34. The shaft 34 includes proximate 36 and distal 38 ends. The shaft 34 also includes an abutment element 39 and a step portion 41. More specifically, the abutment element 39 extends outwardly from the proximate end 36 of the shaft 34, and the step portion 41 of the shaft 34 is included at the proximate end 36. The shaft 34 extends through a bore 40 of the auxiliary housing 24 and reciprocates between the first position 12 and the second position 14. The proximate end 36 of the shaft 34 is disposed in the internal fluid chamber 30, and the distal end 38 of the shaft 34 extends through the bore 40 outwardly from the piston housing 16. Preferably, the shaft 34 is cylindrical in shape. However, the shaft 34 may be any other shape effect the desired shift between the low and high gears of the auxiliary gear box 13 without varying the scope of the subject invention.

The transmission assembly 10 further includes a yoke element 42 coupled to the distal end 38 of the shaft 34. The yoke element 42 is adapted for engaging one of two gears 100, shown schematically, when the shaft 34 is reciprocated between the first 12 and second 14 positions to achieve a desired splitter ratio. Preferably, the yoke element 42 is coupled to the distal end 38 of the shaft 34 via machine screws. However, the yoke element 42 may be coupled to the shaft 34 by any other means suitable to securely couple the yoke element 42 to the shaft 34. A collar 44 is interconnected with the yoke element 42 to engage gears 100. It is to be understood that the Figures represent the collar 44 of the subject invention schematically, and the collar 44 may be interconnected with yoke element 42 and gears 100 in a manner other than as shown.

The transmission assembly 10 further includes a piston 46 disposed on the proximate end 36 of the shaft 34 in the internal fluid chamber 30. The piston 46 is mounted on the proximate end 36 of the shaft 34 such that the proximate end 36 extends through the piston 46. The piston 46 includes a piston bore 47 where the proximate end 36 of the shaft 34 extends through the piston 46. In mounting the piston 46 on the shaft 34, the piston 46 is positioned on the step portion 41 of the shaft 34 where the step portion 41 of the shaft 34 supports the piston bore 47 as the piston 46 is retained against the abutment element 39 of the shaft 34.

The piston is preferably constructed of a non-metallic material. Specifically, the piston 46 includes a core 52 constructed of plastic. The core 52 of the piston 46 is coated with a non-metallic material, such as rubber, to form an exterior 54 of the piston 46. As a result, it is desirable to provide the piston 46 with support. The exterior 54 of the piston 46 includes a plurality of webs 56 also formed from a non-metallic material, preferably the same rubber, and the webs 56 consequently also require support. The piston 46 mates with the inner surface 32 of the internal fluid chamber 30 to divide the internal fluid chamber 30 into first 58 and second 60 internal fluid chambers. The webs 56 of the piston 46 form a seal with the inner surface 32 of the internal fluid chamber 30.

After the piston 46 is mounted to the shaft 34, a retaining device 49 is secured on the proximate end 36 of the shaft 34 for retaining the piston 46 on the shaft 34 against the abutment element 39. More specifically, the proximate end 36 of the shaft 34 is extended through the piston 46 to receive the retaining device 49. The retaining device 49 abuts the step portion 41 of the shaft 34 to retain the piston 46 against the abutment element 39.

The retaining device 49 may be locked on the shaft 34 to permanently retain the piston 46. In a preferred embodiment of the subject invention, the retaining device 49 is constructed of metal, most preferably steel.

The retaining device 49 includes a locking member 48 and a spacing element 50. The locking member 48 is fastened on the proximate end 36 of the shaft 34 to retain the piston 46 against the abutment element 39 of the shaft 34. The proximate end 36 of the shaft 34 actually extends through the piston bore 47 to receive the locking member 48 and secure the piston 46 on the shaft 34. Preferably, the locking member 48 is threaded around a threaded segment 51 of the shaft 34 for retaining the piston 46 where the locking member 48 is then torqued until the piston 46 abuts the abutment element 39 of the shaft 34. As such, the locking member 48 is preferably a nut. However, the scope of the subject invention is not varied by utilizing a locking member 48 other than a nut affixed on the threaded segment 51 of the shaft 34.

After mounting the piston 46 on the shaft 34, but prior to fastening the locking member 48, the spacing element 50 of the retaining device 49 is mounted on the proximate end 36 of the shaft 34. As such, the spacing element 50 is disposed on the proximate end 36 of the shaft 34 between the locking member 48 and the piston 46 to retain the piston 46 against the abutment element 39. In such a position, the piston 46 is disposed between and abuts the spacing element 50 and the abutment element 39, and the spacing element 50 abuts the step portion 41 of the shaft 34. More specifically, as the locking member 48 is fastened on the proximate end 36 of the shaft 34, the locking member 48 displaces the spacing element 50 until the spacing element 50 contacts the step portion 41 of the shaft 34 to retain the piston 46 against the abutment element 39. As such, damage to the piston during assembly is avoided. The step portion 41 of the shaft 34 has a predetermined geometry on the shaft 34 to facilitate quick and efficient assembly of the piston 46, the spacing element 50, and the locking member 48 on the shaft 34.

The subject invention further includes first 66 and second 68 shoulder elements. The operation of the second shoulder element 68 will be described below. As shown in FIG. 1, the first shoulder element 66 extends outwardly from the abutment element 39 at the proximate end 36 of the shaft 34. However, it is to be understood that the abutment element 39 and the first shoulder element 66 may be a single, continuous element extending outwardly from the proximate end 36 of the shaft 34 without varying the scope of the subject invention. The first shoulder element 66 extends circumferentially outward from the proximate end 36 of the shaft 34 and is disposed between the piston 46 and the first abutment surface 26 of the auxiliary housing 24. The piston 46 is disposed on the shaft 34 to abut the first shoulder element 66. Additionally, the spacing element 50 introduced above is displaced to retain the piston 46 firmly against the first shoulder element 66.

The first shoulder element 66 serves two primary purposes. First, in conjunction with the abutment element 39 and the retaining device 49, the first shoulder element 66 operates to retain the piston 46 on the shaft 34. As a result, less rigid pistons constructed from non-metallic materials are retained firmly in place and are properly seated. That is, the piston 46 does not lean or tilt, and the piston 46 properly mates with the inner surface 32 of the internal fluid chamber 30. Second, the first shoulder element 66 operates to prevent the piston 46 from mechanically stopping against the piston housing 16 by preventing direct contact between the piston 46 and the piston housing 16 when the shaft 34 and the yoke element 42 are actuated between the first 12 and second 14 positions. That is, the first shoulder element 66, not the piston 46, directly contacts the piston housing 16 when the shaft 34 and the yoke element 42 are in the second position 14 thereby preventing direct contact between the piston 46 and the first abutment surface 26 of the auxiliary housing 24.

Details of the first 66 and second 68 shoulder elements can be better understood from co-pending U.S. patent application Ser. No. 09/571,819, entitled "Auxiliary Gear Box Piston Stops" filed on May 16, 2000 herewith, and assigned to the same assignee as this application.

After securing the retaining device 49, the shaft 34 of the transmission assembly 10 is inserted through the bore 40 of the auxiliary housing 24 of the auxiliary gear box 13. After the shaft 34 is inserted through the bore 40, the second shoulder element 68 is mounted on the shaft 34 to secure the shaft 34 in the bore 40 of the housing 24. The second shoulder element 68 extends outwardly from the distal end 38 of the shaft 34 and directly contacts the piston housing 16 when the shaft 34 and the yoke element 42 are in the first position 12. As a result, direct contact between the piston 46 and the first end 20 of the piston cylinder 18 is prevented. More specifically, the second shoulder element 68 is disposed at the distal end 38 of the shaft 34 to directly contact the second abutment surface 28 of the auxiliary housing 24 as the shaft 34 and the yoke element 42 return from the second position 14 to the first position 12.

The second shoulder element 68 has a predetermined geometry and is disposed at a predetermined position relative to the shaft 34 and the piston 46 that ultimately prevents the piston 46 from directly contacting the first end 20 of the piston cylinder 18. As FIG. 1 shows, the second shoulder element 68 preferably extends circumferentially outward from the distal end 38 of the shaft 34. Note that in the preferred embodiment, the yoke element 42 is coupled to the distal end 38 of the shaft 34 by the second shoulder element 68. The collar 44, which engages the auxiliary gear box 13 when the shaft 34 and the yoke element 42 are actuated between the first 12 and second 14 positions, is interconnected with the yoke element 42 opposite the second shoulder element 68.

Once assembled, the subject invention incorporates a valve 62 to selectively direct fluid into one of the fluid chambers 58, 60 to displace the piston 46 thereby actuating the shaft 34 and the yoke element 42 between the first 12 and second 14 positions. In the Figures, the valve 62 is only shown schematically. The details of the control of fluid to the chambers 58, 60 maybe as known.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. A transmission assembly for a heavy vehicle, said assembly comprising:
   a multi-speed main gear box;
   an auxiliary gear box coupled to said main gear box;
   a shaft associated with said auxiliary gear box, said shaft including an abutment element extending outwardly from said shaft; and
   a fluid cylinder, and a piston mounted on said shaft and movable within said fluid cylinder under the influence of fluid pressure, for moving said shaft to engage said auxiliary gear box wherein said piston is constructed of a non-metallic material and is supported by said abutment element.

2. An assembly as set forth in claim 1 further including a retaining device secured on said shaft for retaining said piston on said shaft against said abutment element.

3. An assembly as set forth in claim 2 wherein said shaft further includes a step portion, said retaining device abutting said step portion to retain said piston against said abutment element.

4. An assembly as set forth in claim 3 wherein said shaft further includes proximate and distal ends, said abutment element of said shaft extending outwardly from said proximate end of said shaft.

5. An assembly as set forth in claim 4 wherein said piston is mounted on said proximate end of said shaft such that said proximate end of said shaft extends through said piston to receive said retaining device.

6. An assembly as set forth in claim 2 wherein said retaining device includes a locking member and a spacing element, said spacing element disposed on said shaft between said locking member and said piston to retain said piston against said abutment element.

7. An assembly as set forth in claim 6 wherein said spacing element abuts said step portion to retain said piston against said abutment element.

8. An assembly as set forth in claim 6 wherein said piston is disposed between and abuts said spacing element and said abutment element.

9. An assembly as set forth in claim 6 wherein said piston includes a piston bore, said proximate end of said shaft extends through said piston bore to receive said locking member.

10. An assembly as set forth in claim 9 wherein said step portion supports said piston bore as said piston is retained against said abutment element.

11. A transmission assembly for a heavy vehicle, said assembly comprising:
    a multi-speed main gear box;
    an auxiliary gear box coupled to said main gear box;
    a shaft associated with said auxiliary gear box, said shaft having proximate and distal ends and an abutment element extending outwardly from said proximate end of said shaft;
    a fluid cylinder and a piston mounted on said proximate end of said shaft such that said proximate end extends through said piston, said piston being movable within said fluid cylinder, and said fluid cylinder receiving pressurized fluid to move said piston, and to selectively actuate gears within said auxiliary gear box;
    a retaining device secured on said proximate end of said shaft for retaining said piston on said shaft against said abutment element; and
    said proximate end of said shaft including a step portion, said retaining device abutting said step portion to retain said piston against said abutment element.

12. An assembly as set forth in claim 11 wherein said piston is constructed of a non-metallic material.

13. A method of assembling a piston in a transmission assembly for a heavy vehicle wherein the assembly includes a multi-speed main gear box, an auxiliary gear box coupled to the main gear box, and a shaft associated with the auxiliary gear box and having an abutment element and proximate and distal ends, said method comprising the steps of:
    mounting a non-metallic piston on the shaft, and in a cylinder, such that pressurized fluid is delivered into said cylinder to move said non-metallic piston and to selectively engage gears associated with the auxiliary gear box; and securing a retaining device on the shaft subsequent to mounting the piston for retaining the piston against the abutment element of the shaft.

14. A method as set forth in claim 13 wherein the step of securing the retaining device on the proximate end of the shaft is further defined by fastening a locking member of the retaining device on the shaft for retaining the piston against the abutment element of the shaft.

15. A method as set forth in claim 14 wherein the step of fastening the locking member of the retaining device is further defined by threading the locking member around a threaded segment of the shaft for retaining the piston against the abutment element of the shaft.

16. A method as set forth in claim 15 wherein the step of threading the locking member around the threaded segment of the shaft is further defined by torquing the locking member until the piston abuts the abutment element of the shaft.

17. A method as set forth in claim 14 wherein the step of fastening the retaining device is further defined by mounting a spacing element of the retaining device on the shaft subsequent to mounting the piston and prior to fastening the locking member.

18. A method as set forth in claim 17 wherein the step of fastening the retaining device is further defined by displacing the spacing element to contact a step portion of the shaft thereby retaining the piston against the abutment element of the shaft.

19. A method as set forth in claim 18 wherein the step of mounting the piston on the shaft is further defined by positioning the piston on the step portion of the shaft.

20. A method as set forth in claim 13 further including the step of locking the retaining device on the shaft to permanently retain the piston against the abutment element of the shaft.

21. A method as set forth in claim 13 further including the step of inserting the shaft of the transmission assembly through a bore of a housing of the auxiliary gear box.

22. A method as set forth in claim 21 further including the step of mounting a shoulder element on the shaft to secure the shaft in the bore of the housing.

* * * * *